3,664,681
AIR SPRING MOUNTING FOR PICKUP TRUCKS
Ellis B. Thaxton, Arlington, Tex., assignor to Ride-Rite Corp., Arlington, Tex.
Filed Dec. 4, 1970, Ser. No. 95,117
Int. Cl. B60g 11/56
U.S. Cl. 280—124 F                    6 Claims

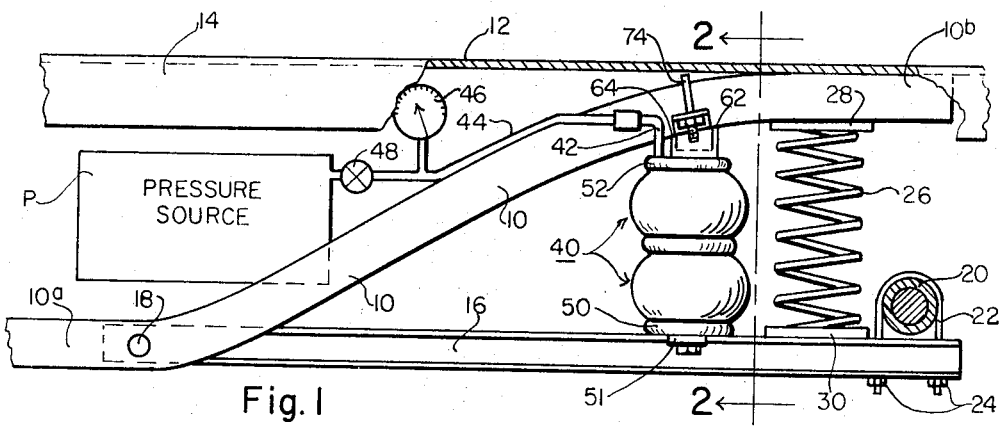
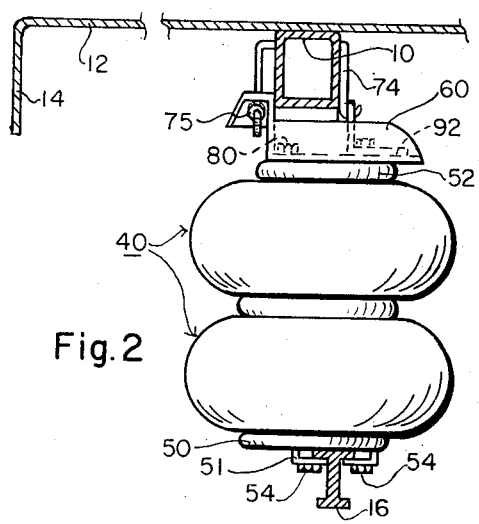
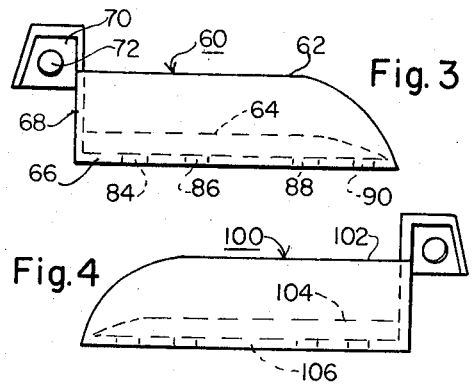
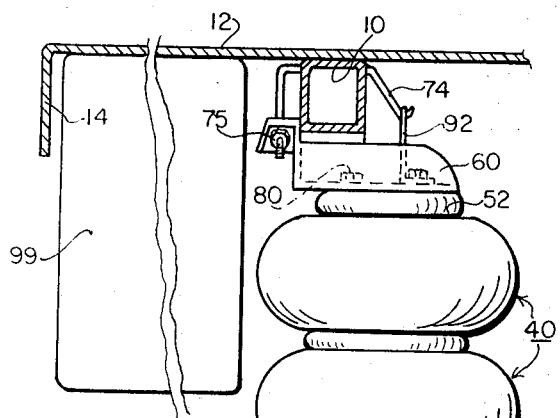
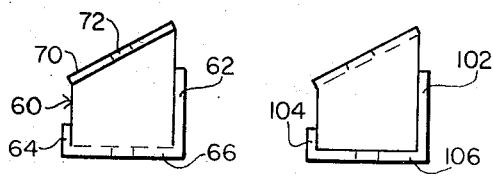
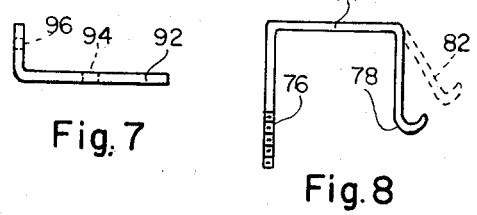
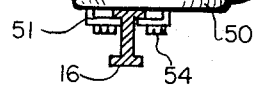
May 23, 1972    E. B. THAXTON    3,664,681
AIR SPRING MOUNTING FOR PICKUP TRUCKS
Filed Dec. 4, 1970
INVENTOR.
ELLIS B. THAXTON
BY
Alexander & Dowell
ATTORNEYS United States Patent Office 3,664,681
Patented May 23, 1972

ABSTRACT OF THE DISCLOSURE

Mountings for auxiliary air springs to prevent overloading of the regular spring system of a vehicle of the type having longitudinal chassis frame members which are arched over the vehicle axle, which axle is supported on radius arms pivotally connected to the frame members ahead of their arched portions, the mountings compensating for non-parallel relationships between the frame members and the radius arms at the locations where the air springs are mounted, and the mountings being easily installed without requiring drilling of the vehicle structures.

---

This invention relates to means for mounting auxiliary air springs to bolster the rear suspension of pickup trucks or other vehicles of the type having a frame member which is arched or raised where it passes over the rear axle of the truck and includes a radius arm pivotally connected to the frame forward of the axle and extending rearwardly to support the axle.

The current practice of using pickup trucks to support heavy modular body modifications such as camper bodies has made it desirable to provide auxiliary spring suspension means to increase the support at the rear axle suspension of the truck, especially in view of the fact that a camper body adds enough weight to the truck so that its ordinary suspension is likely to become seriously overloaded, thereby causing squatting of the truck chassis and dangerous handling characteristics. The applicant is aware that air springs are commercially available in the form of shock absorbers having pneumatic pressure capabilities by which the truck body can be levelled, but because of the small diameter and general construction of these shock absorbers they usually have to be pressurized to around 100 lbs. per square inch which results in a very stiff ride for the vehicle.

It is a major object of this invention to provide easily installed mounting means for large-diameter air springs of the type used on larger trucks, railway cars, etc., such mountings providing means by which the air springs can be conveniently added to the vehicle near each end of the axle by insertion of the air springs between the raised portions of the main chassis frame and the radius arms pivotally connected thereto to support the axle. The air springs, thus mounted, can either be pumped up at a gasoline station to level the truck body, or else the truck may carry own compression system. A suitable pressure gauge is an optional extra which is of assistance in arriving at and maintaining the correct pressure.

It is another major object of this invention to provide a mounting means for supporting an air spring between a frame member and a radius arm pivotally connected thereto in such a way that the installation can be easily accomplished with simple hand tools by a person having relatively small mechanical skill, and it is an especially important feature of the invention that air springs can be added to a vehicle using the present mounting means without requiring any modification whatever of the vehicle frame members or radius arms, such as drilling and/or welding, whereby the vehicle is not defaced or weakened by the addition.

A more specific object of the invention is to provide means for clamping the lower ends of multiple-cushion air springs to the radius arms which supports the truck axle, and to further provide novel bracket means which are efficient for mounting the air spring to the arched chassis frame members located above the radius arms, in such a way that the entire mounting procedure can be accomplished from a position which is transversely outside of the truck chassis by tightening of a single nut at one end of a U-bolt, the inner portion of the U-bolt being hooked through an opening in the upper bracket assembly and requiring no adjustment once the air spring is in place on the truck.

It is another object of the invention to provide an upper mounting bracket for securing air springs to the truck frame, which bracket can be made from a single stamped blank which can be bent or formed in one direction to form a right-hand-spring mounting bracket, and can be formed in the other direction to provide a left-hand-spring mounting bracket. Another object of the invention is to provide a two-piece upper mounting bracket means which cooperates with a U-bolt in such a way that the air spring can either be centered with respect to the truck frame, this being the normal mounting, or else can be offset inwardly from the center of the frame by assembling the bracket parts in different mutual positions, thereby leaving the portion of the underside of the truck body lying outside of the frame member to which the air spring is mounted free to receive auxiliary fuel tanks, commonly known in the pickup truck art as saddle tanks.

Another object of the invention is to provide novel air spring mounting means which compensate for the fact that the surfaces against which the air spring mountings are to fit, including the lower surface of the arched truck frame and the upper surface of the radius arm, are not mutually parallel at the mounting position of the air spring when the truck suspension is adjusted to a level position.

Other objects and advantages of the invention will become apparent during the following discussion of the drawing, wherein:

FIG. 1 is a partial elevation view of the left rear suspension of a vehicle of the type to which the present invention relates, FIG. 1 showing the auxiliary air spring mounted between the arched vehicle frame member and the axle supporting radius arm;

FIG. 2 is an enlarged partial section view taken along line 2—2 of FIG. 1;

FIG. 3 is an enlarged elevation view of the left-hand channel member of an upper bracket assembly;

FIG. 4 is an elevation view of the right-hand channel member of a bracket assembly;

FIGS. 5 and 6 are left-hand views, respectively, of the channel members shown in FIGS. 3 and 4;

FIG. 7 is an enlarged elevation view of an angle member comprising part of a bracket assembly;

FIG. 8 is a view of a U-bolt used in each bracket assembly; and

FIG. 9 is a view similar to FIG. 2, but showing an air spring mounted such that is is displaced inwardly of the truck body so that a saddle tank can be installed outside of the spring supporting frame member and beneath the truck body.

Referring now to the drawing, FIGS. 1, 2 and 9 show portions of a pickup truck body and suspension including a chassis frame member 10 supporting the floor 12 of a truck body, the floor 12 being in the form of a platform having a downwardly turned skirt 14 along its outer edge. As can be seen in FIGS. 2 and 9 the chassis frame member 10 is a box construction, and is raised from its lower forward end 10a to an elevated position 10b above the truck axle 20 in a way which is common to most vehicles having a frame of this type. The truck suspension also includes a radius arm 16 on each side of the truck, each arm being connected at a suitable pivot 18 to the chassis frame member 10 at a position in front of the truck axle 20. This axle is commonly mounted by shackle means 22 to the radius arm 16, the shackle means being secured and tightened by nuts 24. In the present illustrative embodiment, a suspension coil spring 26 comprises the standard spring suspension on the truck and is mounted at its top on a suitable spring pad 28 which is secured to the chassis frame member 10, whereas the bottom of the spring is mounted on a spring pad 30 which is secured to the top of the radius arm 16. The members described thus far are standard suspensions for many vehicles, including pickup trucks, and are therefore not considered to be novel per se in the present disclosure.

This disclosure is primarily concerned with the use of a multiple cushion air spring comprising an elastomeric bladder whose diameter is relatively large so that low air pressures can be used to level the vehicle body while preserving a relatively soft riding characteristic. Typical air springs of the type to which the invention relates are shown in Pats. 3,063,732; 3,064,994; 3,112,922 and 3,227,470, which generally show several elastomeric bladder members terminated at their opposite ends in metal plates to which they are mounted, the plates often having threaded bolt holes used to secure the plates to whatever means they are to be bolted. Most of these disclosures show a suitable valve stem through which air under pressure can be introduced in order to pressurize the spring.

In the present disclosure, the air spring elastomeric bodies are designated by the reference numeral 40, the bodies being connected through a valve stem 42 to an air pressure line 44. As an optional feature, an air pressure gauge 46 can be added to the line 44 which can then be fed through a valve 48 from any suitable pressure source P, the latter being either contained within the vehicle or comprising the pump source of a gasoline station. The elastomeric bodies have end plates 50 and 52 to which they are secured, and which end plates have recessed bolt holes therein which are preferably threaded for easy mounting, for instance, as shown in Pat. 3,112,922. This is a common type of mounting expedient, and will be found in many other prior art showings.

As can be seen best in FIGS. 1 and 2, the lower mounting plate 50 of the elastomeric spring 40 is secured in place against the top of the radius arm beam 16 by suitable L-shaped mounting lugs 51 which are held in place by bolts 54. The vertical portion of the lugs 51 is a little shorter than the thickness of the upper surface of the eye beam 16 so that when the bolts 54 are tightened, the lugs 51 prevent the plate 50 from displacement longitudinally of the arm 16. This can be a relatively simple mounting because the lower plates 50 lie flush against the top surface of the radius arms 16. However, the upper plates 52 cannot lie flush against the lower surface of the chassis frame member 10 because the angle which the frame member makes to the horizontal is too steep and would distort the elastomeric spring bodies unduly. It is not necessary that the end plates 50 and 52 of the elastomeric bodies be kept perfectly parallel, but it is not desirable to mount them at a steep angle in view of the fact that they must be capable of further distortion when the truck is in motion and the radius arm 16 is changing its position about its pivot 18.

FIGS. 3, 4, 5, 7 and 8 show suitable upper bracket assembly members for supporting the plate 52 in a substantially level position beneath the chassis frame member 10. The bracket assembly includes suitable shackle means such as the U-bolt 74 which passes over the frame member 10 and secures the rest of the bracket assembly to it. As can be seen best in FIGS. 3 and 4, the upper mounting assembly includes a channel member 60 which has two upwardly extending flanges 62 and 64, the flange 62 being higher than the flange 64 as can best be seen in FIGS. 1 and 5. The difference in height of these two flanges is selected so that the bottom web 66 of the channel will be substantially horizontal when the channel is secured to the chassis frame member with the flanges 64 and 62 lying against its under surface as shown in FIG. 1. One end of the channel is bent upwardly as shown at 68 and at its top supports an outwardly extending bolt plate 70 having a hole 72 through it to receive the threaded end 76 of the U-bolt 74 shown in FIG. 8. The bottom web 66 of the channel has two sets of two holes 84, 88 and 86, 90 which cooperate with a pair of tapped holes (not shown) in the upper plates 52. Therefore, the bracket 60 can be mounted in either of two different positions as shown in FIG. 2 and in FIG. 9, the channel member 60 being bolted to the upper plate 52 in the position shown in FIG. 2 using the holes 84 and 88, but being bolted to the plate 52 in the position shown in FIG. 9 using the holes 86 and 90 for the purpose hereinafter stated.

The angle member 92 shown in FIG. 7 has a longer leg with a hole 94 in it and a shorter leg with a hole 96 in it. When the air springs are to be mounted in the position shown in FIG. 2, the hooked end 78 of the U-bolt shown in FIG. 8 is hooked through the hole 96 in the angle member 92 shown in FIG. 7 and the angle member 92 is then bolted through the hole 94 and the hole 88 into the channel member 60 as shown in FIG. 2. The bolt 80 then secures the other end of the channel member 60 to the end plate through the hole 84. In this position, the air springs are substantially centered with respect to the under surface of the chassis frame member 10.

On the other hand, when saddle tanks 99 are carried by the vehicle, held thereon by suitable straps (not shown), it is desirable to move the air spring in-board of the truck to provide greater clearance with respect to the tank and in this case the U-bolt shown in FIG. 8 is bent so as to move its hooked end to the dotted-line position 82. Moreover, the angle member 92 is then bolted through the hole 96 and through the hole 90 in the position shown in FIG. 9. In this event, the other bolt 80 holding the channel member 60 to the upper plate 52 will be passed through the hole 86, thereby displacing the air spring end plate 52 inwardly.

If it is desirable to also displace the bottom plate 50 inwardly, the bottom plate 50 can either be provided with alternative holes, or else the lugs 51 can be manufactured to provide different mounting positions for the lower plate 50 of the air spring, so that it can be moved in-board of the truck with respect to the upper surface of the radius arm 16, thereby providing full clearance for the saddle tank.

The channel member 110 shown in FIGS. 4 and 6 is made from the same metal stamping as the one shown in FIG. 3, but is reversed with respect thereto so as to mount an air spring on the right suspension of the truck. The channel member 100 has a higher raised flange 102 and a lower raised flange 104, and includes similar sets of holes in the bottom web 106 of the channel member so that the same spring plate 52 can be used interchangeably on either the right or the left side of the vehicle.

MOUNTING OPERATION

It will be noted that the above structure provides a particularly easily mounted air spring to be used as an auxiliary load-sharing suspension device to level a heavily-loaded vehicle body. The lower plate 50 of the elastomeric spring is held on the upper surface of the radius arm 16 by the two lugs 51 which are tightened against the radius arm by the bolts 54. The hooked end 78 of the U-bolt 74 is then passed beneath the truck platform 12 and above the inclined chassis frame member 10 and hooked into the appropriate hole, either 96 or 94, of the angle member 92. The threaded end 76 of the U-bolt shown in FIG. 8 is passed through the bolt hole 72 in the bolt plate 70 and is tightened down there-against by a nut 75 which is conveniently located out-board of the vehicle with respect to the chassis frame member 10, and can therefore be easily tightened.

Shifting of the position of the air springs 40 inwardly of the truck body as shown in FIG. 9 merely requires bending the hooked end 78 of the U-bolt shown in FIG. 8 to the position 82 shown in dotted lines, shifting the channels to the other set of holes, and then re-bolting the bolts 54, all done to shift the elastomeric air spring 40 to the position shown in FIG. 9 which provides greater clearance for the saddle tank 99 which can be mounted within the skirt 14 and below the platform 12 of the truck body.

This invention is not to be limited to the exact structure shown in the drawing, for obviously changes may be made therein within the scope of the following claims.

I claim:

1. In a vehicle of the type including longitudinal frame members respectively having portions raised above a vehicle axle which is secured on radius arms pivoted to the frame members adjacent to their raised portions and supported on vehicle springs disposed between the radius arms and the frame members, mountings for auxiliary air springs having opposed upper and lower end plates for securing the air springs between the respective radius arms and the raised portions of the associated frame members, comprising:
   (a) lug means for mounting the lower end plate of each air spring on the upper surface of a radius arm; and
   (b) mounting means at the top of each air spring for securing its upper end plate to the associated raised frame portion and each mounting means comprising a channel member having a web portion bolted to the upper end plate of the air spring and having two upstanding flanges disposed transversely across the frame member, the respective heights of the flanges being such that the web portions of the channel members lie substantially parallel to the lower end plates of the air springs, and shackle means disposed over the frame members and securing the channel members thereto.

2. Air spring mountings as set forth in claim 1, wherein said channel members have apertured bolt-plate means extending beyond the channel members to receive the shackle means, the bolt plate means being disposed at an angle to the web portions equal to the angle of a plane lying across said upstanding flanges.

3. Air spring mountings as set forth in claim 2, wherein said bolt-plate means of the channel members comprise portions of the channel webs extending beyond the flanges and bent to said angles as determined by the heights of said flanges.

4. Air spring mountings as set forth in claim 1, wherein each shackle means comprises a U-bolt which has one threaded end and one hooked end, and each channel member has an apertured bolt-plate at the end of the channel member extending transversely outwarly of the vehicle to receive said threaded end which is tightened thereagainst by a nut; and an angle member having two legs, each with a hole therethrough, the legs of the angle member being of such width as to snugly fit within the channel, the angle member having one leg overlying the web portion and bolted to the upper end plate together therewith and the other leg extending upwardly and securing the hooked end of the U-bolt.

5. Air spring mountings for a vehicle as set forth in claim 4, wherein the frame members are spaced inwardly of the vehicle body and auxiliary fuel tanks are optionally carried under the body adjacent to and outside of the frame members, the upper end plates of the air springs having a set of bolt holes, and the web portions of the channel members having plural matching sets of bolt holes, whereby the upper end plates of the air springs can be mounted substantially transversely centered on the frame members in the absence of said auxiliary fuel tanks and can be remounted in inwardly displaced positions when said auxiliary fuel tanks are carried.

6. Air spring mountings as set forth in claim 5, wherein said angle members have first and second, respectively longer and shorter legs, the angle members being selectively bolted at their longer legs to the end plates through one hole in the web portions and receiving the hook ends of the U-bolts in their shorter legs when the air springs are centered on the frame member, and optionally being bolted at their shorter leg to the end plate through different holes in the web portions and receiving the hook ends of the U-bolts in their longer legs when the air springs are mounted in inwardly displaced positions.

References Cited
UNITED STATES PATENTS 3,235,221   2/1966   Conner _____ 267—65 A
3,154,321   10/1964  Mc Lean _____ 267—15 A PHILIP GOODMAN, Primary Examiner U.S. Cl. X.R.

267—15, 34